US012452499B2

(12) United States Patent
Das et al.

(10) Patent No.: US 12,452,499 B2
(45) Date of Patent: Oct. 21, 2025

(54) SYSTEM AND METHOD FOR OBTAINING CHANNEL TRACKING DATA FROM A SET-TOP BOX

(71) Applicant: Star India Private Limited, Mumbai (IN)

(72) Inventors: Kaushik Das, Mumbai (IN); Rahul Patil, Nashik (IN); Tejaswi Bonda, Hyderabad (IN); Akhtar Jalaludheen, Mumbai (IN); Nidhi Chadha, Mumbai (IN)

(73) Assignee: JIOSTAR INDIA PRIVATE LIMITED, Mumbai (IN)

(*) Notice: Subject to any disclaimer, the term of this patent is extended or adjusted under 35 U.S.C. 154(b) by 310 days.

(21) Appl. No.: 17/905,489

(22) PCT Filed: Mar. 4, 2021

(86) PCT No.: PCT/IN2021/050210
§ 371 (c)(1),
(2) Date: Sep. 1, 2022

(87) PCT Pub. No.: WO2021/176475
PCT Pub. Date: Sep. 10, 2021

(65) Prior Publication Data
US 2024/0040207 A1  Feb. 1, 2024

(30) Foreign Application Priority Data
Mar. 4, 2020  (IN) .............................. 202021009245

(51) Int. Cl.
H04N 21/658 (2011.01)
H04N 21/258 (2011.01)
H04N 21/81 (2011.01)

(52) U.S. Cl.
CPC ... *H04N 21/6582* (2013.01); *H04N 21/25866* (2013.01); *H04N 21/812* (2013.01)

(58) Field of Classification Search
CPC ......... H04N 21/6582; H04N 21/25866; H04N 21/812; H04N 21/44222; H04H 60/31; H04H 60/43; H04H 60/66
See application file for complete search history.

(56) References Cited

U.S. PATENT DOCUMENTS

2007/0074258 A1*  3/2007  Wood .................. H04N 21/438
                                                       725/105
2007/0174862 A1*  7/2007  Kushida ................ H04N 21/47
                                                        725/15

(Continued)

FOREIGN PATENT DOCUMENTS

WO    2021176475 A1    9/2021

OTHER PUBLICATIONS

U.S. Appl. No. 18/045,547, entire non-provisional application, filed Oct. 11, 2022.

(Continued)

*Primary Examiner* — Nathan J Flynn
*Assistant Examiner* — Christine A Kurien
(74) *Attorney, Agent, or Firm* — Evergreen Valley Law Group; Kanika Radhakrishnan

(57) ABSTRACT

A method and system (150) for obtaining channel tracking data from a set-top box (106) is disclosed. A channel being viewed on a display device associated with the set-top box (106) is tracked. An occurrence of a channel switching event is detected in relation to the channel being viewed on the display device. Subsequent to detecting the occurrence of the channel switching event, determine whether the channel was viewed for at least a first predefined time threshold. A payload comprising the channel tracking data in relation to (Continued)

the channel is generated if the channel was viewed for at least the first predefined time threshold. A data packet is generated comprising data fields and the payload. The data packet configured to be below a predefined byte size limit is transmitted from the set-top box (106) to a remote server (118) using LoRaWAN protocol.

20 Claims, 4 Drawing Sheets

(56) References Cited

U.S. PATENT DOCUMENTS

| 2009/0055871 | A1* | 2/2009 | Song | H04N 11/02 |
| | | | | 725/54 |
| 2019/0349848 | A1* | 11/2019 | Bali | H04L 12/2801 |

OTHER PUBLICATIONS

International Search Report, Application No. PCT/IN2021/050210, mailing date Jun. 4, 2021, 2 pages.

* cited by examiner

SYSTEM AND METHOD FOR OBTAINING CHANNEL TRACKING DATA FROM A SET-TOP BOX

CROSS-REFERENCE TO RELATED APPLICATIONS

This application is a national application and, pursuant to 35 U.S.C. § 365, is entitled to and claims the right of priority based on international application no. PCT/IN2021/050210 filed Mar. 4, 2021, which claims priority from Indian provisional patent application 202021009245, filed Mar. 4, 2020, all of which are incorporated herein in its entirety by this reference thereto.

TECHNICAL FIELD

The present technology generally relates to set-top boxes (STBs), more particularly, to a system and method for obtaining channel tracking data from a STB.

BACKGROUND

Television (TV) sets of the viewers may be monitored to obtain channel tracking data such as, for example, channels viewed by respective viewers, duration of viewing of the channels, and the like. The channel tracking data obtained from the individual TV sets may be collated to generate statistical information, such as but not limited to, viewership associated with a particular channel, a show, a sports event, or even an advertisement (Ad) spot, viewership associated with a timeslot, viewership associated with a market, and the like. The collated statistical information is referred to herein as 'audience measurement' data. The audience measurement data may be generated and tracked for several reasons. In an illustrative example, broadcasters and production houses may wish to determine the type of content that may be of interest to viewers and the audience measurement data may assist the broadcasters and the production houses in customizing their content. In another illustrative example, advertisers may wish to choose one Ad among several Ads and the audience measurement data may assist the advertisers in selecting the Ad to enable the advertisers achieve a higher success rate.

With increasing popularity of digital television (DTV) sets, obtaining of channel tracking data has become relatively easier as compared to conventional TV (or analog TV) because of the increased usage of set-top boxes (STBs). A STB is a device that decodes television signals from terrestrial or extraterrestrial sources and transmits the decoded television signals to a TV set. The signal decoded by the STB is presented to a viewer by the TV set in the form of a channel. As most of the DTV sets are connected to the STBs, channel tracking data may be obtained by monitoring the STBs.

To obtain channel tracking data from STBs, conventional solutions mainly rely on automatic content recognition (ACR), people meter and return path data (RPD) measurement systems. In an illustrative example, ACR techniques such as audio watermarking or fingerprinting may be used by the people meter, which is a small physical box connected to the TV, to track the channel being viewed. The detailed log of channels viewed by the subscriber may be transmitted to cable operators or direct-to-home (DTH) providers from the STB by the RPD measurement system. The RPD measurement system typically utilizes existing cellular and/or Wi-Fi communication protocols to transmit the subscriber logs to the cable/DTH providers.

Though serving the purpose of enabling collection of channel tracking data, the conventional solutions suffer from delays in collection of channel tracking data and do not support real-time tracking of channel data. The conventional solutions also suffer from several other drawbacks. For example, the collation of audience measurement data is limited to only a sample audience on account of the high cost involved in enabling ACR/RPD measurement systems and in transmitting the channel tracking data. The sample audience considered for generating the audience measurement data may not be an accurate reflection of the composition of the national TV audience in each market. Moreover, apart from being prohibitively expensive, the cellular/Wi-Fi protocols use a high amount of power in transmitting the channel tracking data to remote entities.

Accordingly, there is a need for a low cost, low power mechanism for obtaining channel tracking data from STBs and transmitting the channel tracking data over long distances to enable viewership measurement at scale.

SUMMARY OF INVENTION

In an embodiment of the invention, a method for obtaining channel tracking data from a set-top box is disclosed. The method tracks, by a system, a channel being viewed by at least one viewer on a display device associated with the set-top box. The method detects, by the system, occurrence of a channel switching event in relation to the channel being viewed by the at least one viewer on the display device. Subsequent to detecting the occurrence of the channel switching event, the method determines, by the system, whether the channel was viewed for at least a first predefined time threshold. If the channel was viewed for at least the first predefined time threshold, the method generates, by the system, a payload including the channel tracking data in relation to the channel. The method generates, by the system, a data packet including one or more data fields and the payload. The method transmits, by the system, the data packet from the set-top box to a remote server using a LoRaWAN protocol. A size of the data packet is configured to be below a predefined byte size limit.

In an embodiment of the invention, a system for obtaining channel tracking data from a set-top box is disclosed. The system includes a memory module, a processing module and a communication module. The memory module stores machine executable instructions, that when executed by the processing module, cause the system to track a channel being viewed by at least one viewer on a display device associated with the set-top box. The system detects occurrence of a channel switching event in relation to the channel being viewed by the at least one viewer on the display device. Subsequent to detecting the occurrence of the channel switching event, the system determines whether the channel was viewed for at least a first predefined time threshold. If the channel was viewed for at least the first predefined time threshold, the system generates a payload including the channel tracking data in relation to the channel. Further, the communication module is operably coupled to the processing module and thereby cause the system to generate a data packet including one or more data fields and the payload. The system transmits the data packet from the set-top box to a remote server using a LoRaWAN protocol. A size of the data packet is configured to be below a predefined byte size limit.

In another embodiment of the invention, a method for generating audience measurement data is disclosed. The method tracks, by a system, a channel being viewed by at least one viewer on a television associated with the set-top box. The method detects, by the system, occurrence of a channel switching event in relation to the channel being viewed by the at least one viewer on the television. Subsequent to detecting the occurrence of the channel switching event, the method determines, by the system, whether the channel was viewed for at least a first predefined time threshold. If the channel was viewed for at least the first predefined time threshold, the method generates, by the system, a payload including the channel tracking data in relation to the channel. The method generates, by the system, a data packet including one or more data fields and the payload. A size of the data packet is configured to be below a predefined byte size limit. The method transmits, by the system, the data packet from the set-top box to a remote server using a LoRaWAN protocol. A plurality of data packets received from a plurality of set-top boxes are collated by the remote server to generate the audience measurement data. Further, one or more channels or advertisements to be broadcasted to the plurality of set-top boxes are customized based, at least in part, on the audience measurement data.

BRIEF DESCRIPTION OF DRAWINGS

The advantages and features of the invention will become better understood with reference to the detailed description taken in conjunction with the accompanying drawings, wherein like elements are identified with like symbols, and in which.

Figure 1:
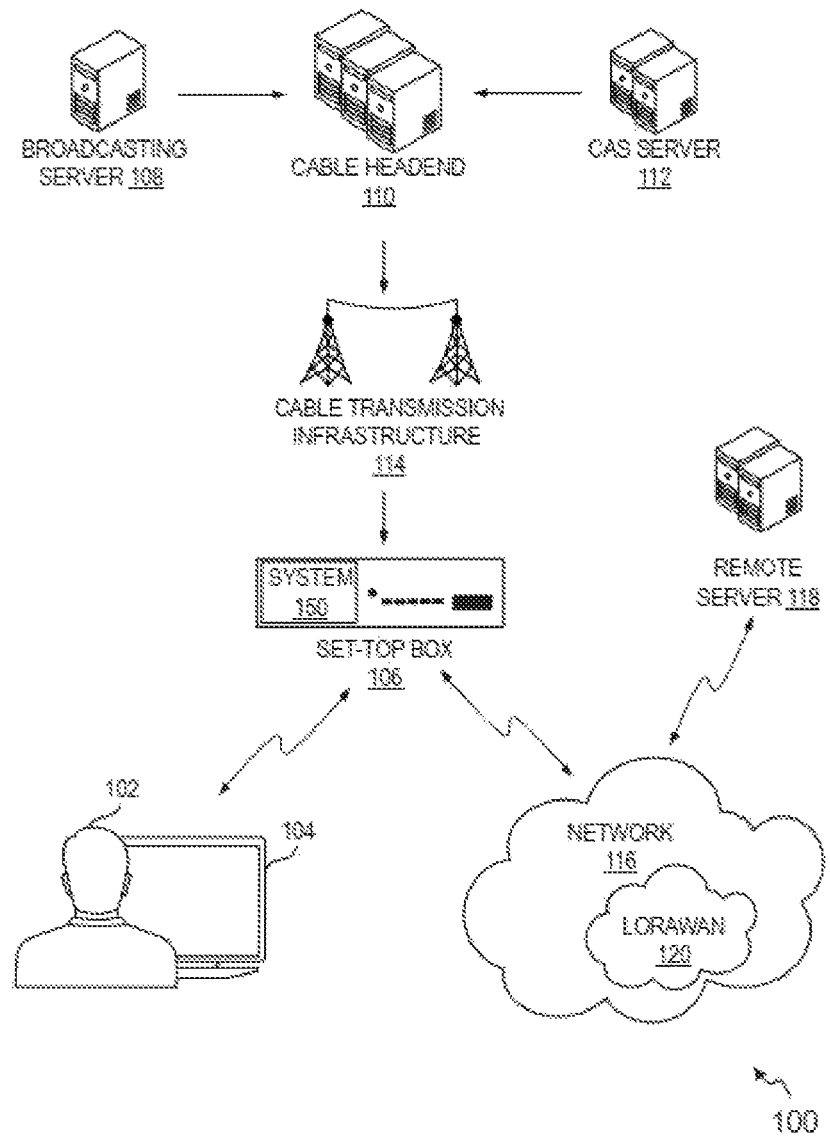
FIG. 1 shows a representation for illustrating an example environment relevant to at least some embodiments of the present invention.

The drawings referred to in this description are not to be understood as being drawn to scale except if specifically noted, and such drawings are only exemplary in nature.

DETAILED DESCRIPTION

The best and other modes for carrying out the present invention are presented in terms of the embodiments, herein depicted in FIGS. 1 to 6. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

The term "channel switching event" as used herein refers to a viewer changing a channel currently viewed by him/her on a display device. The channel being viewed on the display device can be switched using physical buttons, remote control, remote application installed on a viewer device or hand gestures. In other words, the channel switching event indicates that the viewer has switched his/her view from one channel to another channel.

Overview—Current solutions for obtaining channel tracking data from TV sets involve monitoring of set-top boxes (STBs) and acquiring channel information from the STBs. The channel tracking data may be obtained from STBs, using automatic content recognition (ACR), people meter and return path data (RPD) measurement systems. However, such solutions have several drawbacks. For example, the RPD system utilizes cellular and/or Wi-Fi communication protocols to transmit the channel tracking data to remote entities which consumes a high amount of power. In some cases, the people meter being a small physical box for tracking channels consumes less power. However, physical installation of the people meter is limited to a few households and therefore the collation of audience measurement data from such people meters is limited to only a sample audience. The sample audience considered for generating audience measurement data may not accurately reflect viewing habits of a national TV audience. As such, conventional solutions fail to obtain channel tracking data from STBs of all viewers with optimum power usage and compromise on the accurate reflection of the audience measurement data.

Various embodiments of the present invention provide a method and a system for obtaining channel tracking data from a set-top box. As per the proposed method, channels being viewed by a viewer on a display device are monitored at the set-top box. More specifically, a channel being viewed is tracked for determining a channel switching event. When the viewer switches a channel, channel tracking data in relation to the channel switching event is collated. In one embodiment, a payload is generated if the channel was viewed for at least a first predefined time threshold. The channel tracking data in the payload is configured to include information such as, a frame number, a time stamp, a time duration, a Channel Number (CN), and a chip ID. In one embodiment, a heartbeat packet is generated if the channel switching event is not detected for a second predefined time threshold.

In one embodiment, a data packet including one or more data fields and the payload is generated. A size of the data packet is configured to be below a predefined byte size limit of 51 bytes. The data packet is transmitted from the set-top box to a remote server using a LoRaWAN protocol. In one embodiment, a Universal Serial Bus (USB) dongle includes a LoRaWAN chip to facilitate transmission of the data packet.

Further, a status of the set-top box is monitored to provide an indication of a current state of the set-top box. A current status of the set-top box indicates at least one of an active state, a standby state and an error state. Error state represents either an interruption of cable signal associated with the set-top box, a deactivation of the channel being viewed by a viewer, or an error encountered by the set-top box. After detecting the current status of the STB, a status packet is transmitted to the remote server.

Further, a maximum of 144 data packets are transmitted per day in uplink to the remote server and a maximum of three downlink packets are received per day in downlink from the remote server. For example, a downlink packet includes resend requests from the remote server. The resend request includes at least one frame number corresponding to a lost data packet. In one embodiment, the lost data packets are identified based on corresponding frame numbers and retransmitted to the remote server.

The channel tracking data, as explained above, is collated from a plurality of set-top boxes by the remote server to generate audience measurement data. In one embodiment, channels or advertisements to be broadcasted to the set-top box are customized based, at least in part, on the audience measurement data. Obtaining channel tracking data from a set-top box is further explained with reference to FIGS. 1 to 6.

FIG. 1 shows a representation 100 for illustrating an example environment relevant to at least some embodiments of the present invention.

The representation 100 depicts a viewer 102 engaged in viewing a television (TV) set 104. The TV set 104 is hereinafter referred to as TV 104. The TV 104 is configured to display digital media content in form of high-definition (HD) video and/or standard-definition (SD) video to the viewer 102. The TV 104 is depicted to be in operative communication with a set-top box (STB) 106. For example, an Audio/Video (AV) connection or a High-Definition Multimedia Interface (HDMI) connection may be used to connect the TV 104 to the STB 106. The STB 106 is configured to decode TV signals received from terrestrial sources (such as cable TV infrastructure) or extraterrestrial sources (such as satellites) and transmit the decoded TV signals to the TV 104. The signal decoded by the STB 106 is presented to the viewer 102 by the TV 104 in the form of a channel.

The representation 100 further depicts a broadcasting server 108, which is configured to receive digital media content, such as the SD video or the HD video, from the broadcasters and/or by the cable system operators. Some non-limiting examples of the digital media content may include content such as news content, sports related content, entertainment content, and the like. The broadcasting server 108 transmits the digital media content to a cable headend 110.

The cable headend 110 is configured to decode, multiplex, re-encode the received digital media content from the broadcasting server 108 and transmit the re-encoded digital media content to a cable transmission infrastructure 114. The cable headend 110 is depicted to be in operative communication with a conditional access sequence (CAS) server 112.

The CAS server 112 is configured to generate entitlement control messages (ECMs) and provide the ECM to the cable headend 110. The ECMs are transmitted along with digital media content by the cable headend 110 to the cable transmission infrastructure 114. The ECM is configured to facilitate conditional access to the digital media content, i.e. only authorized subscribers can access the digital media content. The cable transmission infrastructure 114 transmits the digital media content along with the corresponding ECMs to STBs, such as the STB 106. In at least one embodiment, the digital media content and the corresponding ECMs transmitted to the STBs are embodied as signals, referred to hereinafter as television signals.

It is noted that the cable transmission infrastructure 114 may utilize relevant standards and protocols, such as those related to at least one of digital video broadcasting (DVB), advanced television systems committee (ATSC), integrated services digital broadcasting (ISDB), digital TV standards for mobile and fixed terminals (DTMB), digital multimedia broadcasting (DMB), and the like, for transmission of content to the STBs. It is also noted that though the standards mentioned above are relevant for broadcast transmission of digital television over cable, in some embodiments, the digital media content may be transmitted to the STBs over non-cable infrastructure, such as fiber or satellite infrastructure, and accordingly relevant standards and protocols applicable to such infrastructures may be utilized for transmission purposes.

The STB 106 is configured to decode television signals received from the cable transmission infrastructure 114 and present the decoded signals as digital content to the viewer 102 through the TV 104 in the form of a channel. The STB 106 may be monitored for obtaining channel tracking data such as, for example, channels viewed by respective viewers, duration of viewing of the channels, and the like. The channel tracking data may be transmitted over a communication network, such as a network 116, to a remote server 118. The remote server 118 may be embodied as one of a network server, an application server, and the like. The network 116 may include wired networks, wireless networks, and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of a combination of wired and wireless networks may include the Internet.

In one embodiment, the remote server 118 embodied as an application server is configured to collate channel tracking data obtained from the STBs, such as the STB 106, to generate statistical information, such as but not limited to, viewership by a particular channel, a show, a sports event, or even an advertisement (Ad) spot, viewership by a timeslot, viewership by a market, and the like. The collated statistical information is referred to herein as 'audience measurement' data. It is noted that the audience measurement data may be generated in real-time and tracked for use by broadcasters in customizing content for the channel audience, by advertisers for generating targeted advertising campaigns, and the like.

To obtain channel tracking data from STBs, conventional solutions mainly rely on automatic content recognition (ACR), people meter and return path data (RPD) measurement systems. Though serving the purpose of enabling collection of channel tracking data, such conventional solutions suffer from several drawbacks. For example, the collation of audience measurement data is limited to only a sample audience on account of the high cost involved in enabling RPD/ACR systems and in transmitting the channel tracking data. The sample audience considered for generating audience measurement data may not be an accurate reflection of the composition of the national TV audience in each market. Moreover, apart from being prohibitively expensive, the cellular/Wi-Fi protocols use a high amount of power in transmitting the channel tracking data to remote entities.

To overcome the aforementioned drawbacks and provide additional advantages, a system 150 for obtaining channel tracking data from a set-top box, such as the STB 106, is provided. The system 150 is configured to facilitate transmission of the channel tracking data over a Low power low Range Wide Area Network (LoRaWAN) 120 to the remote server 118. The system 150 is explained in further detail with reference to [FIG. 2].

Figure 2:
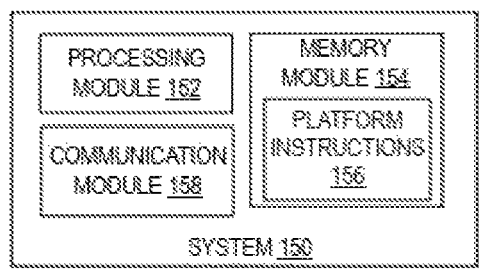
FIG. 2 is a block diagram of a system configured to obtain channel tracking data from a set-top box (STB), in accordance with an embodiment of the invention.

[FIG. 2] is a block diagram of a system 150 configured to obtain channel tracking data from a set-top box (STB), in accordance with an embodiment of the invention.

The term 'channel tracking data' as used herein primarily implies data that may be used to track usage of channels by a TV viewer associated with the set-top box, such as the STB 106 shown in [FIG. 1]. Accordingly, in at least some embodiments, information related to a channel viewed by a TV viewer or currently being viewed by a TV viewer may be captured as channel tracking data and transmitted to a remote server. In some embodiments, the information related to the channel viewed or being viewed by the TV viewer includes, but is not limited to a channel identifier, a duration of viewing of the channel, a channel number, and the like.

In some embodiments, the channel tracking data may also include rich information, such as data related to frequency of channel switching, a sequence of channels viewed, a preference of time slots for channel viewing, and the like. Further, the term 'obtaining channel tracking data' as used herein implies receiving the channel tracking data from the STB, which may involve generation of data packets including a payload corresponding to the channel tracking data in the STB and transmission of the data packets from the STB using a transmission protocol that ensures low cost, low power transmission to a remote processing server.

The channel tracking data may be collated for generating statistical information, i.e. for generation of audience measurement data, as explained with reference to [FIG. 1].

In at least one embodiment, the system 150 may be included within a STB such as the STB 106. In some embodiments, the system 150 may be disposed external to the STB and configured to be in operative communication with the STB. The system 150 includes at least one processing module, such as a processing module 152 and a memory module 154. It is noted that although the system 150 is depicted to include only one processing module, the system 150 may include more number of processing modules therein. In an embodiment, the memory module 154 is capable of storing machine executable instructions, referred to herein as platform instructions 156. Further, the processing module 152 is capable of executing the platform instructions 156. In an embodiment, the processing module 152 may be embodied as a multi-core processor, a single core processor, or a combination of one or more multi-core processors and one or more single core processors. For example, the processing module 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a micro-controller unit (MCU), a hardware accelerator, a special-purpose computer chip, or the like. In an embodiment, the processing module 152 may be configured to execute hard-coded functionality. In an embodiment, the processing module 152 is embodied as an executor of software instructions, wherein the instructions may specifically configure the processing module 152 to perform the algorithms and/or operations described herein when the instructions are executed.

The memory module 154 may be embodied as one or more non-volatile memory devices, one or more volatile memory devices and/or a combination of one or more volatile memory devices and non-volatile memory devices. For example, the memory module 154 may be embodied as semiconductor memories, such as flash memory, mask ROM, PROM (programmable ROM), EPROM (erasable PROM), RAM (random access memory), etc. and the like.

The processing module 152 is configured to (1) monitor channels being viewed on a display device such as, the TV 104, and (2) generate a payload including the channel tracking data. When a viewer changes a channel while watching TV, the processing module 152 is configured to check if the channel is viewed for a first predefined time threshold. If the channel is viewed for the first predefined time threshold, then the processing module 152 generates a payload, which includes information such as but not limited to a start time (i.e. a time at which the viewer started viewing the channel), a duration of viewing the channel, a channel number (i.e., channel number corresponding to channel viewed prior to channel switching event), frame number and chip ID. In one embodiment, the channel number may be a Logical Channel Number (LCN) is a landing channel number which is displayed first when the STB is switched ON. It is noted that if the channel is not viewed for the first predefined time threshold, then no payload is generated. In one embodiment, the first predefined time threshold may be selected based on experimental data or on observed viewer behavior. For example, the first predefined time threshold may be chosen to be one minute duration. Accordingly, the payload is generated only if the channel is viewed for more than one minute. If the channel is not viewed for one minute duration, then no payload containing the channel tracking data is generated.

The system 150 is further depicted to include a communication module 158. The communication module 158 is configured to: (1) generate status packets indicating status of the STB, (2) generate data packets encapsulating the payload in the STB and (3) transmit the channel tracking data from the STB to a remote entity, such as for example, the LoRaWAN gateway, the LoRaWAN server or the remote server 118 shown in [FIG. 1], using LoRaWAN protocol.

The use of LoRaWAN protocol for transmission of channel tracking data addresses the cost concern, as the use of LoRaWAN protocol as a transmission protocol is cheaper than deploying expensive people meter systems and using cellular/Wi-Fi protocols for transmission of channel tracking data. Moreover, the power consumed by the STB is also drastically reduced on account of the use of LoRaWAN as a transmission protocol. A brief description of LoRaWAN protocol follows:

LoRaWAN protocol is a point-to-multipoint networking protocol that supports highly secure, wireless data communication for applications that require long-range and low-power connectivity to the Internet without Wi-Fi. One or more end-nodes, such as the STBs, may communicate with a LoRaWAN gateway using encrypted radio waves. The LoRaWAN gateway, in turn, may communicate with other LoRaWAN gateways or with a LoRaWAN server to enable transmission of data packets from the STBs to remote entities, such as the remote server 118. The LoRaWAN protocol specifies three device types such as class A, class B and class C. The class A device type supports bi-directional communication between a device and a LoRaWAN gateway, class B device type extends class A by scheduling receive windows for downlink messages from a remote server. The class C device type extends class A by keeping the receive windows open unless the device is transmitting.

To realize low power long range packet transmission, the LoRaWAN protocol currently limits the size of each data packet to a maximum of 51 bytes. Further, the maximum number of data packets that can be sent per day in uplink from the STB to a LoRaWAN network server is recommended to not exceed 144 data packets. Furthermore, as LoRaWAN is an Aloha based non-collision free network, i.e. it cannot detect collision before sending packets, the protocol limits the number of downlink requests to a maximum of 3 downlink packets per day to save network bandwidth. Such limitations of the LoRaWAN protocol makes it challenging to use the LoRaWAN protocol for transmission of channel tracking data from the STB. It is noted that LoRaWAN limitations as mentioned herein, such as (1) a maximum data packet size of 51 bytes, or (2) a maximum of 144 data packets in uplink channel per day, or (3) a maximum of 3 data packets in downlink channel per day, should not be considered to be limiting the scope of the present invention. Indeed the limitations on the size of each data packet and the maximum number of uplink and downlink packets allowed per day, may vary from one geographical location to another from the examples provided herein.

The communication module 158 is configured to meet all such requirements of the LoRaWAN protocol to ensure transmission of channel tracking data from the STB. More specifically, the communication module 158 is configured to add the LoRaWAN protocol information to the payload so that data transmission complies with the LoRaWAN transmission protocol. To that effect, one or more data fields such as, data sequencing information, error detection and control, flow control, congestion control, routing information, etc. are either added to the header or the footer for the payload. The data packet generated in such a way includes a predefined number of bytes that is lower than 51 bytes, and, moreover, the number of data packets created in a day are minimized to meet the limitations specified by the LoRaWAN protocol (i.e., 144 data packets). An example of the data packet generated in accordance with the LoRaWAN protocol is shown and explained with reference to [FIG. 3].

In one embodiment, the communication module 158 is configured to transmit a status packet indicating a current state of the STB to the remote server. As such, the STB can operate in one among an active state, a standby state and an error state. In one embodiment, when the STB is powered ON, the communication module 158 is configured to generate a 1-byte packet to communicate the active state of the STB to the remote server and also to suggest when to send downlink packets and when the remote server can expect to receive the channel tracking data (i.e., data packets). When there is no activity in the STB for a particular amount of time, then the STB may switch to the standby mode (irrespective of channel viewing duration). Accordingly, the communication module 158 generates the status packet to indicate that the STB is in the standby mode. In some embodiments, the communication module 158 is also configured to generate the status packet when the STB enters the error state. The error state of the STB is indicative of an interruption of a cable signal associated with the STB, a deactivation of the channel currently being viewed by the viewer, or an error encountered by the STB.

In addition to data packets containing information related to such channel tracking data and the current status of the STB, the communication module 158 generates a heartbeat packet after every predefined time interval, referred to herein as a second predefined time threshold, if the viewer has not changed the channel. More specifically, when the viewer continues to view a channel for the second predefined time threshold and if the processing module 152 does not detect a channel switching event, the heartbeat packet is generated. In one non-limiting example, the second predefined time threshold may be selected to be 15 minutes duration. In one example scenario, the viewer may view a cricket match on a sport channel for 20 minutes before switching the channel to view a news channel. Accordingly, the communication module 158 is configured to generate the heartbeat packet if the viewer does not change the channel for 15 minutes. In one embodiment, the heartbeat packet includes information related to a channel currently being viewed by the viewer. However, it shall be noted that the communication module 158 generates a data packet after 20 minutes including channel tracking data when the viewer switches the channel.

The generation of data packets in a selective manner, i.e. generating a data packet only after a channel is changed after viewing the channel for a first predefined time threshold and not generating a data packet if a channel is viewed for less than that duration, drastically reduces the number of data packets transmitted from the STB, thereby allowing the STB to meet the requirement of the LoRaWAN protocol related to sending a maximum of 144 data packets per day on uplink to the remote server. Further, the communication module 158 is configured to encapsulate the payload with additional data fields in a manner such that each data packet includes a predefined number of bytes that is lower than 51 bytes. An example data packet of size 46 bytes is shown in [FIG. 3] for illustration purposes.

Figure 3:
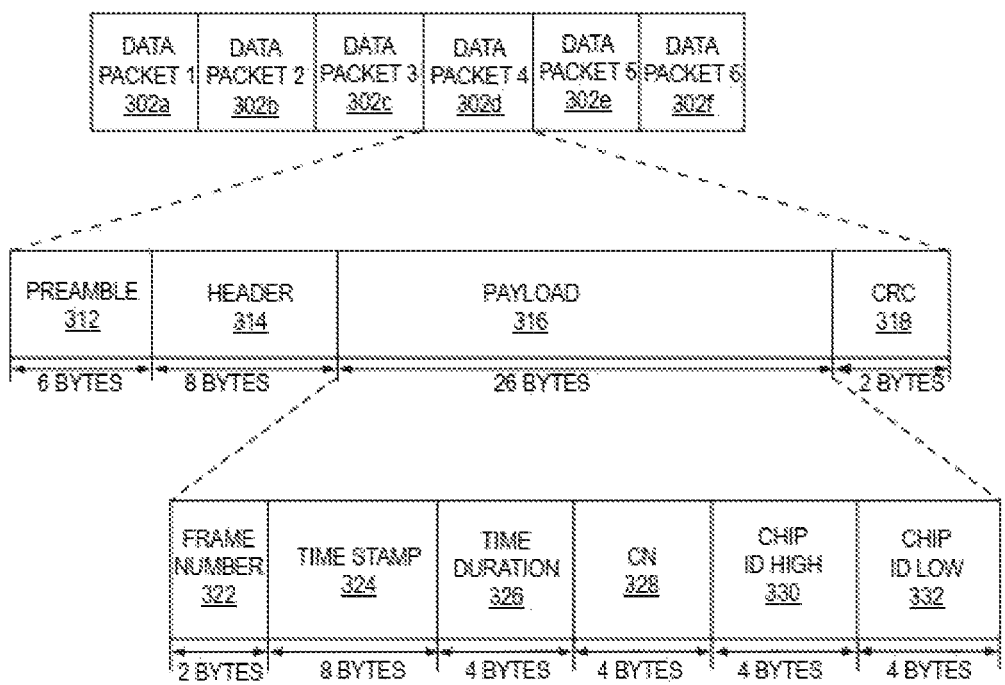
FIG. 3 shows a representation for illustrating an example configuration of a data packet including payload generated by a communication module, in accordance with an embodiment of the invention.

Referring now to [FIG. 3], a representation 300 is shown for illustrating an example configuration of a data packet generated by the communication module 158 (shown in [FIG. 2]), in accordance with an embodiment of the invention. As explained with reference to [FIG. 2], the communication module 158 generates a data packet only after a channel is changed after viewing the channel for a first predefined time threshold, for example one minute duration. In an illustrative example, the viewer may change the channel six times after viewing each channel for one minute each. Accordingly, the communication module 158 may generate six data packets corresponding to each channel switching event (i.e., switching of the channel). The six data packets generated by the communication module 158 are shown as 302a, 302b, 302c, 302d, 302e and 302f corresponding to data packet 1, data packet 2, data packet 3, data packet 4, data packet 5 and data packet 6. The byte-based configuration of each data packet is shown with reference to the data packet 302d, i.e. data packet 4, for illustration purposes in [FIG. 3]. It is noted that data packets 302a, 302b, 302c, 302e and 302f may be associated with similar byte configurations.

In one embodiment, the communication module 158 may generate the data packet 302d by encapsulating a payload 316 with additional data fields provided by the LoRaWAN protocol for proper data sequencing, error detection and control, flow control, congestion control, routing, etc. In this example representation 300, the data packet 302d includes data fields such as a preamble 312, a header 314, and a cyclic redundancy check (CRC) 318. It is understood that such fields may add minimum level of overhead to the payload 316 and as such may not exceed the data packet size restriction of a maximum of 51 bytes.

The field corresponding to the preamble 312 is configured to include a sequence of upchirps and downchirps with a specific symbol length (e.g., 12 symbol lengths) to keep a receiver of the remote server synchronized with incoming payload 316. In an illustrative example, 6 bytes may be assigned to include the symbols for the upchirps and the downchirps related to the preamble 312. The field corresponding to the header 314 is configured to include information such as the number of bytes in the payload, the encoding rate, and whether to enable a payload CRC. It shall be noted that the header 314 is optional and enables disabling the field in situations where it is not necessary, for instance when payload length, encoding rate and CRC presence are known in advance. In an illustrative example, 8 bytes may be assigned to include the information related to the header 314. The field corresponding to the CRC 318 is configured to include control bits to ensure that the payload 316 is received correctly.

The payload 316 is depicted to include fields, such as a frame number 322, a time stamp 324, a time duration 326, a channel number (CN) 328, Chip ID High 330 and Chip ID Low 332. The field corresponding to the frame number 322 is configured to include information related to a count of packets created from the time the STB was last switched ON. In an illustrative example, 2 bytes may be assigned to include the information related to the frame number 322. The field corresponding to the time stamp 324 is configured to include information related to the time from which the channel was viewed. In an illustrative example, 8 bytes may be assigned to include the information related to the time stamp 324. The field corresponding to the time duration 326 is configured to include the time spent on the channel in seconds, for example, time spent on an entertainment channel is 300 seconds. In an illustrative example, 4 bytes may be assigned to include the information related to the time duration 326. The field corresponding to the CN 328 is configured to include information related to the channel number viewed by the viewer prior to the channel switching event. In an illustrative example, 4 bytes may be assigned to include the information related to the CN 328. The field corresponding to the Chip ID High 330 is configured to include information related to the STB chip serial number identifier. In an illustrative example, 4 bytes may be assigned to include the information related to the Chip ID High 330. Similarly, the field corresponding to the Chip ID Low 332 is configured to include information related to the STB chip serial number identifier. In an illustrative example, 4 bytes may be assigned to include the information related to the Chip ID Low 332. The payload generated in such a manner includes only 26 bytes.

As explained with reference to [FIG. 2], the communication module 158 generates the data packet 302d by encapsulating the channel tracking data as payload data, for example, the payload 316. The byte-based configuration of the data packet 302d is shown for illustration purposes in [FIG. 3]. It is noted that data packets 302a, 302b, 302c, 302e and 302f encapsulating payload may be associated with similar byte configurations.

In this illustrative example, size of the data packet 302d is depicted to include 42 bytes, thereby circumventing the size limitation of the LoRaWAN protocol, which restricts the packet size to a maximum 51 bytes. It is noted that the payload size may not be limited to 26 bytes or the configuration shown in [FIG. 3]. Indeed, the payload size as well as the configuration may be modified to enable transmission of the channel tracking data while limiting the packet size to a maximum 51 bytes. For example, in some embodiments, the payload 316 may only include the CN 328 and the time stamp 324 fields. Further, it is noted that such a size of the data packet 302d (i.e. a size less than 51 bytes) precludes data loss while transmission over narrow frequency band, which is typically associated with LoRaWAN transmission.

An example representation of the information included in some fields of the payload 316 is depicted in Table 1:

TABLE 1

| Field | Channel Payload (in DEC format) | Channel Payload (in HEX format) |
| --- | --- | --- |
| Frame Number | 01 00 | [01 00] |
| Time Stamp | 2019:08:12:09:34:21:01 | [E3 07 08 0C 09 22 15 01] |
| Time Duration | 82 | [52 00 00 00] |
| Channel Number (CN) | 100 | [64 00 00 00] |
| Chip ID High | 01 EC 1A 86 | [86 1A EC 01] |
| Chip ID Low | 00 00 72 BF | [BF 72 00 00] |

Given the information in the Table 1, an example payload (in HEX format) may be represented as: 01 00 E3 07 08 OC 09 22 15 01 52 00 00 00 64 00 00 00 86 1A EC 01 BF 72 00 00

Such a payload includes the channel tracking data corresponding to the viewer and may be transmitted using the LoRaWAN protocol to a remote server for generation of the audience measurement data.

Referring back to [FIG. 2], in at least one embodiment, the communication module 158 is also configured to send lost data packets only in response to a lost packet notification received from an end server. It is understood that in conventional return path data (RPD) based implementations, the end server may send an acknowledgement (ACK) packet for each data packet received from the STB. Given the limitation of the LoRaWAN protocol to limit the number of downlink packets to 3 data packets per day, the end server may avoid sending an acknowledgement in response to receipt of each data packet.

The remote server may identify the missing data packets lost in transmission based on frame number information included within the payload of data packets received at the remote server and send a downlink packet including resend requests for all missing/lost data packets only once or twice in a day to the STB. A resend request includes at least one frame number corresponding to a lost data packet. The processing module 152 may identify the lost data packets based on corresponding frame numbers in the downlink packet from the memory module 154. Further, the communication module 158 may be configured to retransmit the corresponding lost data packets in response to such a resend request from the remote server. It is noted that such accommodation of multiple resend requests in a single downlink packet results in less number of downlink packets in a single day.

Thus, the system 150 is configured to enable low power, long range packet transmission of channel tracking data using the LoRaWAN protocol, while overcoming the challenges related to the maximum packet size (for example, 51 bytes), the maximum number of data packets sent per day in uplink (for example, 144 data packets) and the maximum number of data packets allowed in downlink (for example, 3 data packets), which are associated with the use of the LoRaWAN protocol.

In one embodiment, the communication module 158 may be embodied as a USB dongle capable of connecting to the STB using an universal asynchronous receiver/transmitter (UART) interface. Further, the USB dongle is configured to transmit the data packets including the payload corresponding to the channel tracking data using the LoRaWAN protocol to a remote entity. To this effect, the USB dongle may include a LoRaWAN chip for facilitating transmission and reception using the LoRaWAN protocol. In one embodiment, the communication module 158 may be embedded along with the system 150 inside the STB and may be in operative communication with one or more components of the system 150, such as the processing module 152 and the memory module 154. In one embodiment, the various modules of the system 150, such as the processing module 152, the memory module 154, and the communication module 158 may be configured to communicate with each other via or through a centralized circuit system. The centralized circuit system may be various devices configured to, among other things, provide or enable communication between the components of the system 150. In certain embodiments, the centralized circuit system may be a central printed circuit board (PCB) such as a motherboard, a main board, a system board, or a logic board. The centralized circuit system may also, or alternatively, include other printed circuit assemblies (PCAs) or communication channel media.

In at least one embodiment, the modules of the system 150 such as processing module 152, the memory module 154, and the communication module 158 may be implemented as software modules, hardware modules, firmware modules or as a combination thereof. Further, it is noted that the system 150 as explained above may not be limited to the components depicted in [FIG. 2]. For example, the system 150 may include more or less number of components than those depicted in [FIG. 2]. For example, the system 150 may include a super capacitor (not shown in [FIG. 2]) to retain the charge for at least a predefined amount of time (for example, few seconds), when the system 150 does not have access to a power supply. Retaining the charge for some time, may enable the processing module 152 of the system 150 to indicate the current state of the STB to the remote server 118. For example, processing module 152 may send a power OFF notification to the remote server 118 to enable accurate attribution of a channel last viewed prior to the power OFF event.

Figure 4:
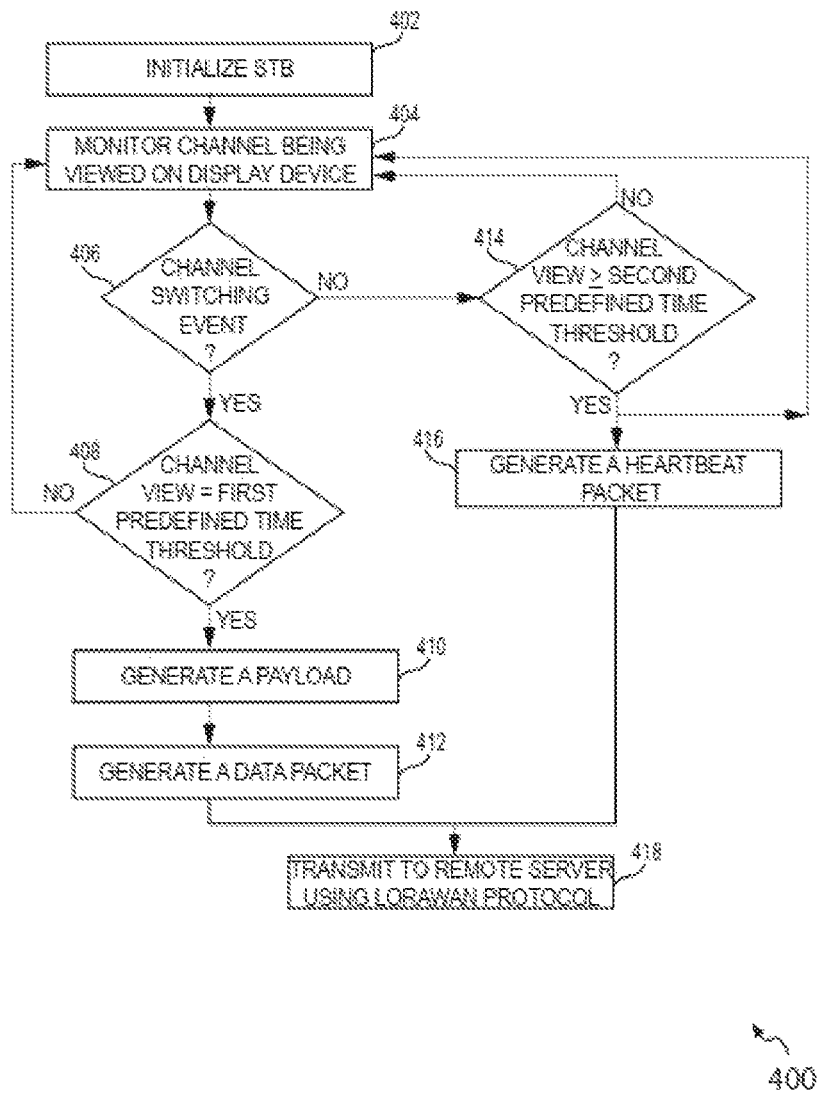
FIG. 4 shows a flow diagram for illustrating a process flow for obtaining channel tracking data from a STB, in accordance with an embodiment of the invention.

Referring now to [FIG. 4], a flow diagram 400 is shown for illustrating a process flow for obtaining channel tracking data from a STB, in accordance with an embodiment of the invention.

At 402, the STB is initialized. For example, the STB may be powered ON, or the STB may have exited a standby state for initiating the initialization process. The STB initialization includes booting of the operating system. Subsequent to the completion of the booting process, the STB performs a check to determine if a communication module, such as the communication module 158 explained with reference to [FIG. 2], is turned ON. In an illustrative example, the communication module may be embodied as a USB dongle. In such a scenario, the STB may perform a check to determine if a USB interface is initialized or not and whether the USB dongle is connected to the USB interface.

At 404, channels being viewed on a display device associated with the set-top box are monitored. When the viewer requests to view a channel, the STB first determines whether it has permission to view a particular channel. The STB then obtains the permission from a CAS server, such as the CAS server 112 shown in [FIG. 1] using ECM, and subsequent to obtaining the access, the STB decodes and tunes the channel. The channel may then be viewed by a STB subscriber (i.e., viewer). Thereafter, channel tracking data corresponding to channel being viewed, such as, frame number, time stamp, time duration, channel number are monitored by the STB. In one embodiment, the channel number corresponds to a landing channel number that is displayed initially when the STB is switched ON.

At 406, a check is performed to determine occurrence of a channel switching event. As such, when a viewer switches a channel (e.g., channel A to channel B), the channel switching event is detected by a system, such as, the system 150. If the channel switching event is determined at operation 406, then operation 408 is performed else operation 410 is performed.

Every time a viewer changes a channel while watching TV, the system 150 associated with the STB is configured to check if the channel was viewed for a first predefined time threshold (for example, one minute) at 408. If the time duration (Tc) for which the channel was viewed is greater than the first predefined time threshold (T1) i.e., Tc≥T1, operation 414 is performed else operation 404 is performed.

At 410, the system 150 generates a payload which includes channel tracking data, such as but not limited to, a start time, a duration viewed, a channel number, a frame number and a chip ID. The payload may be generated as explained with reference to [FIG. 3] and is not explained again herein. It is noted that if a channel is not viewed for the first predefined time threshold (T1), then no payload containing the channel tracking data is generated.

At 412, the system 150 generates a data packet including the payload. More specifically, the channel tracking data in the payload is encapsulated with data fields such as, preamble, header and CRC such that the number of bytes in the data packet does not exceed a predefined number of bytes, for example, 51 bytes. The generation of the data packet may be performed as explained with reference to [FIG. 3]. In one embodiment, bytes may be added to the data packet for LoRaWAN uplink write command.

Additionally, the system 150 determines if the channel switching event in relation to the channel being viewed is not detected for a second predefined time threshold (T2) at 414. More specifically, if the viewer has viewed the channel for the first predefined time threshold T1 and continues to view the channel for a duration that exceeds the second predefined time threshold T2 (T2>T1), the system 150 may not have to send channel tracking data as explained above in the generation of the data packet. In such cases, the system 150 only generates a heartbeat packet (see, 416) to indicate that the viewer is still viewing the same channel (i.e., a travel channel) and continues to monitor the channel being viewed on the display device (see, operation 404). However, it shall be noted that the system 150 generates the data packet including the channel tracking data on detecting the channel switching event.

In an illustrative example, assuming the time duration Tc for which the travel channel was viewed by the viewer is 10 minutes (i.e., Tc=10 minutes), the first predefined time threshold (T1) as 5 minutes and the second predefined time threshold (T2) as 8 minutes, the travel channel was viewed for the time duration Tc greater than the first predefined time threshold T1 and the second predefined time threshold T2 i.e., T1>Tc<T2. As such, a heartbeat packet is generated after 8 minutes and a data packet including the channel tracking data is generated after 10 minutes on detecting the channel switching event. The generation of the heartbeat packet avoids the need for generation of the data packet after every time interval, thereby providing significant power savings during transmission.

At 418, the data packet (from operation 410) or the heartbeat packet (from operation 416) is transmitted to one or more remote servers (e.g., application servers) using LoRaWAN protocol. The remote server may process the payload information (i.e. the channel tracking data) of the data packet and/or the heartbeat packet to generate the audience measurement data.

Figure 5:
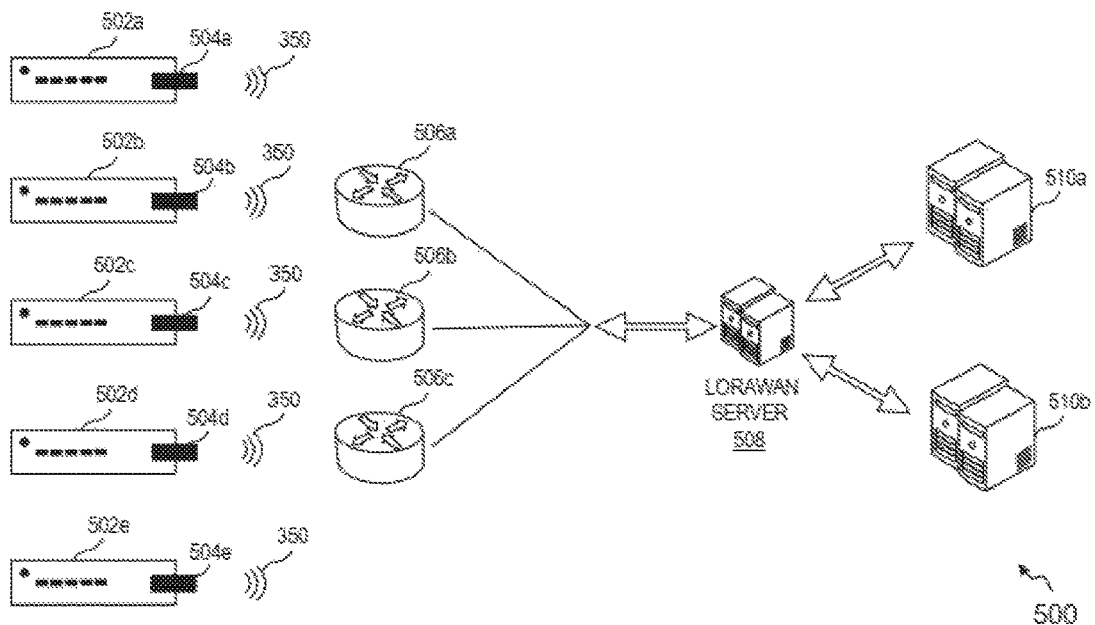
FIG. 5 shows a representation for illustrating an example LoRaWAN architecture for facilitating generation of audience measurement data, in accordance with an embodiment of the invention.

[FIG. 5] shows a representation 500 for illustrating an example LoRaWAN architecture for facilitating generation of audience measurement data, in accordance with an embodiment of the invention. As explained with reference to [FIG. 1], transmission of channel tracking data from a STB to a remote server, such as the remote server 118, is associated with high cost and high power consumption, when conventional people meter based solutions are used. These factors limit the coverage of the audience measurement to a small scale. To perform viewership measurement at scale, LoRaWAN architecture as depicted in the representation 500 may be used.

The representation 500 depicts a plurality of STBs, such as a STB 502a, a STB 502b, a STB 502c, a STB 502d and a STB 502e. Each STB from among the STBs 502a-502e includes a system, such as the system 150 explained with reference to FIGS. 2 to 4. The system included within respective STBs is not shown in [FIG. 5]. A communication module in each system is shown to be embodied as a USB dongle in respective STBs. For example, the STB 502a is associated with a USB dongle 504a, the STB 502b is associated with a USB dongle 504b, the STB 502c is associated with a USB dongle 504c, the STB 502d is associated with a USB dongle 504d and the STB 502e is associated with a USB dongle 504e. Each USB dongle is configured to transmit data packets including channel tracking data using the LoRaWAN protocol (shown using radio waves 350) to nearest LoRaWAN gateways, such as a LoRaWAN gateway 506a, a LoRaWAN gateway 506b and a LoRaWAN gateway 506c. Each LoRaWAN gateway is a low power wide area network (LP-WAN) gateway. It is noted that the payload and the data packet are configured in such a manner that a size of each data packet does not exceed a predefined number of bytes (for example, 51 bytes). Moreover, a maximum number of data packets sent in uplink per day is less than a predefined number (for example, 144 data packets).

In some embodiments, the LoRaWAN gateways may use 3G/Ethernet backhaul to forward the channel tracking data in the form of data packets to a LoRaWAN server 508. Further, in some embodiments, the LoRaWAN server 508 may be configured to forward to one or more application servers, such as an application server 510a and an application server 510b.

Each application server 510a and 510b may be embodied as a decoder, a data processing server, an analytics server and the like, and may be configured to process the audience measurement data based on requirements provided by operators of the application servers 510a and 510b. Some non-limiting examples of the operators of the application servers 510a and 510b may include, but are not limited to advertisers, broadcasters, cable/DTH providers, production houses, media distributors, and the like. In at least one embodiment, the audience measurement data may be processed to learn behavior of viewers and accordingly the content of the channels and/or advertisements displayed on the channels may be customized. For example, if the Ads on a general entertainment channel (GEC) are generating more viewership as compared to a sports channel, the advertiser can focus their campaigns on the GEC channel. Moreover, the customization may be performed at an individual level too. For example, if an individual subscriber of the cable/DTH provider spends more time in watching sports channel, then the cable/DTH provider may offer the subscriber with attractive package deals on bulk subscription of multiple sports channel.

A method for obtaining channel tracking data from a STB is explained next with reference to [FIG. 6].

Figure 6:
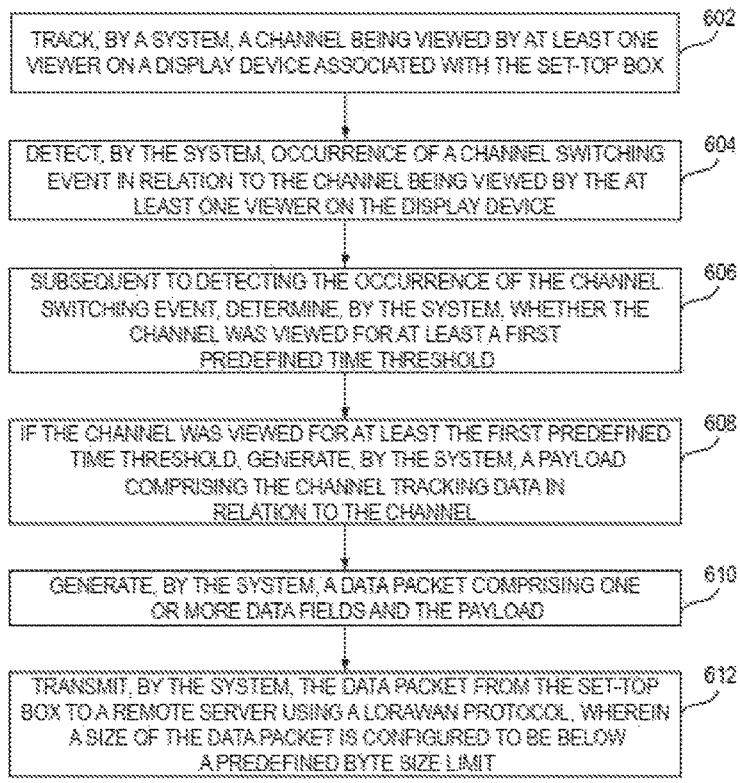
FIG. 6 shows a flow diagram of a method for obtaining channel tracking data from a STB, in accordance with an embodiment of the invention.

[FIG. 6] shows a flow diagram of a method 600 for obtaining channel tracking data from a STB, in accordance with an embodiment of the invention. The various steps and/or operations of the flow diagram, and combinations of steps/operations in the flow diagram, may be implemented by, for example, hardware, firmware, a processor, circuitry and/or by a system such as the system 150 explained with reference to [FIG. 2] to 4 and/or by a different device associated with the execution of software that includes one or more computer program instructions. The method 600 starts at operation 602.

At operation 602 of the method 600, a channel being viewed by at least one viewer on a display device associated with the set-top box is tracked by a system, such as the system 150 explained with reference to [FIG. 2]. In one embodiment, the display device is a television and the channel is tracked at a set-top box, such as the STB 106 shown in [FIG. 1].

At operation 604 of the method 600, occurrence of a channel switching event is detected in relation to the channel being viewed by the at least one viewer on the display device. For example, the viewer may operate a remote control to switch from watching a sports channel to a news channel on the display device. As such, the channel switching event represents switching views from one channel (i.e., sport channel) to the other (i.e., news channel).

At operation 606 of the method 600, subsequent to detecting the occurrence of the channel switching event, the system determines whether the channel was viewed for at least a first predefined time threshold (T1). More specifically, a time period (Tc1) for which the channel was viewed prior to the channel switching event is determined and compared with the first predefined time threshold (T1). Assuming, the first predefined time threshold (T1) to be 5 minutes (i.e., T1=5 minutes), and if the channel (i.e., the sports channel) was viewed for 10 minutes (i.e., Tc1), the sports channel was viewed more than the first predefined time threshold (Tc1>T1).

At operation 608 of the method 600, a payload including the channel tracking data in relation to the channel is generated by the system if the channel was viewed for at least the first predefined time threshold (i.e., Tc1≥T1). In an illustrative example, the payload includes information (i.e., channel tracking data) about the sports channel that was viewed for viewed more than the first predefined time threshold (Tc1>T1). The channel tracking data includes information related to at least one of a frame number, a time stamp, a time duration, a Channel Number (CN), and a chip ID. An example of generating the payload is shown and explained with reference to [FIG. 3].

At operation 610 of the method 600, a data packet including one or more data fields and the payload is generated by the system 150. More specifically, additional data fields include LoRaWAN protocol information to ensure that the data packet is transmitted in a proper way. The additional data fields include information related to proper data sequencing, error detection and control, flow control, congestion control, routing information, etc. In one illustrative example, the payload is encapsulated along with data fields such as, preamble, header, cyclic redundancy check (CRC)

to generate the data packet. The generation of the data packet may be performed as explained in detail with reference to [FIG. 3].

At operation 612 of the method 600, the data packet is transmitted from the set-top box to a remote server using a LoRaWAN protocol. More specifically, a USB dongle including a LoRaWAN chip is employed by the STB to facilitate transmission of the data packet. In one embodiment, a size of the data packet is configured to be below a predefined byte size limit of 51 bytes. Further, a maximum of 144 data packets are transmitted per day in uplink to the remote server thereby reducing the power consumption involved in frequent transmission of data packets between the STB and the remote server.

In one embodiment, a plurality of channel tracking data obtained from a plurality of STBs are collated by the remote server to generate audience measurement data. The audience measurement data is configured to serve as a representation of the viewer's interests. Furthermore, one or more channels or advertisements to be broadcasted to the STB for viewing by the viewer are customized based, at least in part, on the audience measurement data. The method 600 ends at operation 612.

In one embodiment, a method for generating audience measurement data is disclosed. The method includes tracking a channel being viewed by at least one viewer on a Television associated with a set-top box. The tracking may be performed by a system, such as the system 150 shown in [FIG. 2]. The method includes detecting an occurrence of a channel switching event in relation to the channel being viewed by the at least one viewer on the television. For example, the channel switching event is detected when the viewer changes view from one channel to another on the television. After detecting the occurrence of the channel switching event, the method includes determining whether the channel was viewed for at least a first predefined time threshold. If the channel was viewed for at least the first predefined time threshold, the method includes generating a payload including the channel tracking data in relation to the channel. For example, the channel tracking data includes information related to channel viewed by the viewer prior to the channel switching event. The method also includes generating a data packet including one or more data fields (e.g., header, preamble, error detection, and sequencing) and the payload. A size of the data packet is configured to be below a predefined byte size limit. The method further includes transmitting the data packet from the STB to a remote server using a LoRaWAN protocol. A plurality of data packets received from a plurality of set-top boxes are collated by the remote server to generate the audience measurement data. Further, one or more channels or advertisements to be broadcasted to the plurality of set-top boxes are customized based, at least in part, on the audience measurement data.

Various embodiments disclosed herein provide numerous advantages. More specifically, the embodiments disclosed herein suggest techniques for solving the problem of scaling viewership measurement while reducing the cost and power consumption in STBs. As explained with reference to various embodiments, the usage of LoRaWAN protocol in obtaining the channel tracking data from STBs not only reduces cost but also reduces the power consumption involved in transmission of the data packets between the STB and a remote processing server. Moreover, the various limitations of LoRaWAN are also overcome, thereby enabling secure transmission of channel tracking data from STB to the remote processing server.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A method for obtaining channel tracking data from a set-top box, the method comprising:
   tracking, by a system, a channel being viewed by at least one viewer on a display device associated with the set-top box;
   detecting, by the system, occurrence of a channel switching event in relation to the channel being viewed by the at least one viewer on the display device;
   subsequent to detecting the occurrence of the channel switching event, determining, by the system, whether the channel was viewed for at least a first predefined time threshold;
   in response to a determination that the channel was viewed for at least the first predefined time threshold:
   selectively generating, by the system, a payload comprising the channel tracking data in relation to the channel;
   generating, by the system, a data packet comprising one or more data fields and the payload;
   transmitting, by the system, the data packet from the set-top box to a remote server using a LoRaWAN protocol, wherein a size of the data packet is configured to be below a predefined byte size limit; and
   receiving, by the system, a downlink packet comprising a plurality of resend requests for a plurality of lost data packets missed during transmission from the set-top box to the remote server.

2. The method as claimed in claim 1, further comprising:
   generating, by the system, a heartbeat packet if the channel switching event in relation to the channel being viewed is not detected for a second predefined time threshold.

3. The method as claimed in claim 1, wherein the channel tracking data in the payload is configured to include at least one of a frame number, a time stamp, a time duration, a Channel Number (CN), and a chip ID.

4. The method as claimed in claim 1,
   wherein each resend request comprises at least one frame number corresponding to a lost data packet, wherein the method further comprises:
   identifying, by the system, the plurality of lost data packets based on corresponding frame numbers in the downlink packet; and
   retransmitting, by the system, the plurality of lost data packets to the remote server.

5. The method as claimed in claim 1, wherein the system comprises a Universal Serial Bus (USB) dongle, the USB dongle comprising a LoRaWAN chip to facilitate the transmission of the data packet to the remote server using the LoRaWAN protocol.

6. The method as claimed in claim 1, further comprising:
   transmitting, by the system, a status packet to the remote server, wherein the status packet is configured to provide an indication of a current state of the set-top box to the remote server and wherein the current state is selected to be one among an active state, a standby state and an error state.

7. The method as claimed in claim 1, wherein the predefined byte size limit corresponds to 51 bytes.

8. The method as claimed in claim 1, wherein the system is configured to transmit a maximum of 144 data packets per day in uplink to the remote server and receive a maximum of three downlink packets per day in downlink from the remote server.

9. The method as claimed in claim 1, wherein a plurality of data packets received from a plurality of set-top boxes are collated by the remote server to generate audience measurement data and, wherein one or more channels or advertisements to be broadcasted to the set-top box are customized based, at least in part, on the audience measurement data.

10. A system for obtaining channel tracking data from a set-top box, the system comprising:
a memory module for storing instructions;
a processing module configured to execute the instructions and thereby cause the system to at least:
track a channel being viewed by at least one viewer on a display device associated with the set-top box,
detect occurrence of a channel switching event in relation to the channel being viewed by the at least one viewer on the display device,
subsequent to detecting the occurrence of the channel switching event, determine whether the channel was viewed for at least a first predefined time threshold, and
in response to a determination the channel was viewed for at least the first predefined time threshold,
selectively generate a payload comprising the channel tracking data in relation to the channel; and
a communication module operably coupled to the memory module and the processing module, the communication module configured to cause the system to at least:
in response to a determination that the channel was viewed for at least the first predefined time threshold:
generate a data packet comprising one or more data fields and the payload,
transmit the data packet from the set-top box to a remote server using a LoRaWAN protocol, wherein a size of the data packet is configured to be below a predefined byte size limit, and
receive a downlink packet comprising a plurality of resend requests for a plurality of lost data packets missed during transmission from the set-top box to the remote server.

11. The system as claimed in claim 10, wherein the system is further caused to:
generate a heartbeat packet if the channel switching event in relation to the channel being viewed is not detected for a second predefined time threshold.

12. The system as claimed in claim 10, wherein the channel tracking data in the payload is configured to include at least one of a frame number, a time stamp, a time duration, a Channel Number (CN), and a chip ID.

13. The system as claimed in claim 10,
wherein each resend request comprises at least one frame number corresponding to a lost data packet, wherein the system is further caused to:
identify the plurality of lost data packets based on corresponding frame numbers in the downlink packet; and
retransmit the plurality of lost data packets to the remote server.

14. The system as claimed in claim 10, wherein the system comprises a Universal Serial Bus (USB) dongle, the USB dongle comprising a LoRaWAN chip to facilitate the transmission of the data packet to the remote server using the LoRaWAN protocol.

15. The system as claimed in claim 10, wherein the system is further caused to:
transmit a status packet to the remote server, wherein the status packet is configured to provide an indication of a current state of the set-top box to the remote server and wherein the current state is selected to be one among an active state, a standby state and an error state.

16. The system as claimed in claim 10, wherein the predefined byte size limit corresponds to 51 bytes.

17. The system as claimed in claim 10, wherein the system is configured to transmit a maximum of 144 data packets per day in uplink to the remote server and receive a maximum of three downlink packets per day in downlink from the remote server.

18. The system as claimed in claim 10, wherein a plurality of data packets received from a plurality of set-top boxes are collated by the remote server to generate audience measurement data and, wherein one or more channels or advertisements to be broadcasted to the set-top box are customized based, at least in part, on the audience measurement data.

19. A method for generating audience measurement data, the method comprising:
tracking, by a system, a channel being viewed by at least one viewer on a Television associated with a set-top box;
detecting, by the system, occurrence of a channel switching event in relation to the channel being viewed by the at least one viewer on the Television;
subsequent to detecting the occurrence of the channel switching event, determining, by the system, whether the channel was viewed for at least a first predefined time threshold;
in response to a determination that the channel was viewed for at least the first predefined time threshold:
selectively generating, by the system, a payload comprising a channel tracking data in relation to the channel;
generating, by the system, a data packet comprising one or more data fields and the payload, wherein a size of the data packet is configured to be below a predefined byte size limit;
transmitting, by the system, the data packet from the set-top box to a remote server using a LoRaWAN protocol, wherein a plurality of data packets received from a plurality of set-top boxes are collated by the remote server to generate the audience measurement data and, wherein one or more channels or advertisements to be broadcasted to the plurality of set-top boxes are customized based, at least in part, on the audience measurement data; and
receiving, by the system, a downlink packet comprising a plurality of resend requests for a plurality of lost data packets missed during transmission from the set-top box to the remote server.

20. The method as claimed in claim 19,
wherein each resend request comprises at least one frame number corresponding to a lost data packet, wherein the method comprises:
identifying the plurality of lost data packets based on corresponding frame numbers in the downlink packet; and retransmitting, by the system, the plurality of lost data packets to the remote server.

\* \* \* \* \*